J. NIERODKA.
CONDIMENT HOLDER.
APPLICATION FILED OCT. 29, 1919.

1,326,524.

Patented Dec. 30, 1919.

Inventor
J. Nierodka

Attorney

UNITED STATES PATENT OFFICE.

JOHN NIERODKA, OF DETROIT, MICHIGAN.

CONDIMENT-HOLDER.

1,326,524.   Specification of Letters Patent.   Patented Dec. 30, 1919.

Application filed October 29, 1919. Serial No. 334,235.

*To all whom it may concern:*

Be it known that I, JOHN NIERODKA, a citizen of Poland, residing at Detroit, in the county of Wayne and State of Michigan, have invented certain new and useful Improvements in Condiment-Holders, of which the following is a specification.

The primary object of the invention is the provision of a holder for condiments providing in a neat and handy device separate chambers for salt and pepper normally maintained closed but readily opened singly or collectively for sifting the contents of the holder as may be desired.

A further object of the invention is the provision of a salt and pepper shaker having ornamental appearance and not likely to upset adapted for holding condiments and normally preventing the escape thereof, but readily adjusted when desired for sifting the salt and pepper and automatically returning to its closed position when released.

A still further object of the invention is to provide a condiment holder adapted for sifting salt and pepper without inverting the holder, the construction being easy and inexpensive to manufacture and capable of long use without getting out of order.

With these general objects in view, the invention consists of the novel combination and arrangement of parts hereinafter fully described in connection with the accompanying drawing and in which like reference characters designate corresponding parts throughout the several views.

Figure 1:
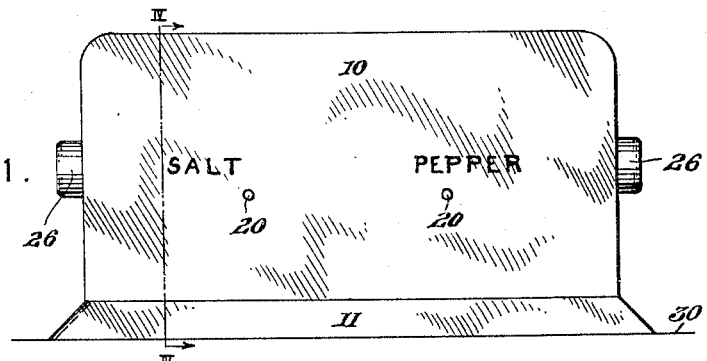
Figure 1 is an elevational view of the invention.
Figure 2:
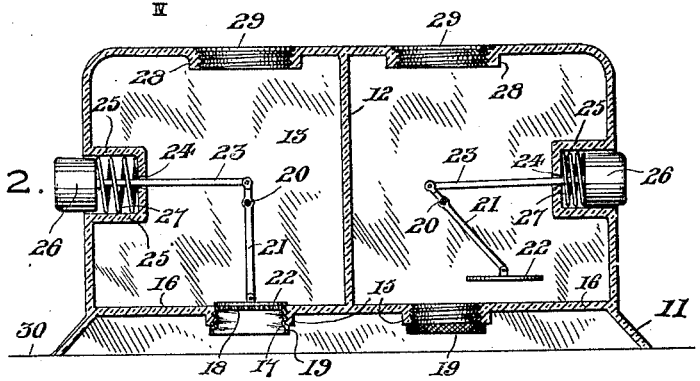
Fig. 2 is a central longitudinal sectional view thereof.
Figure 3:
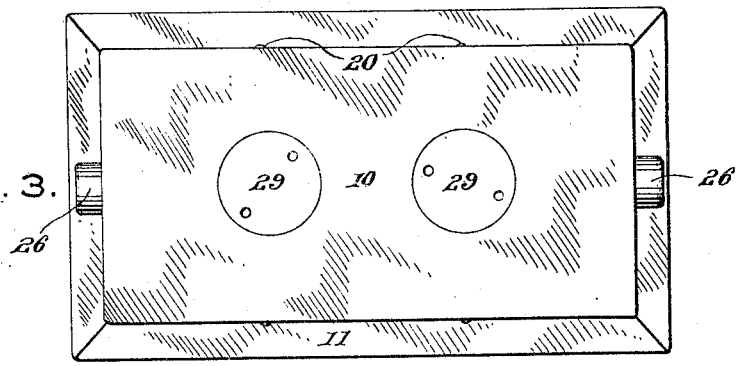
Fig. 3 is a top plan view of the same.
Figure 4:
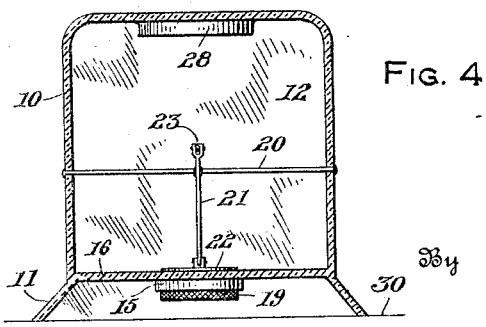
Fig. 4 is a transverse sectional view taken upon line IV—IV of Fig. 1.

Referring more in detail to the drawing, a casing 10 is provided having a base flange 11 for mounting the holder upright upon any support such as a table, a transverse partition 12 centrally of the casing dividing the same into two compartments 13 and 14 for holding condiments such as salt and pepper.

A threaded boss 15 is provided upon the bottom 16 of the casing 10 for gaining access to the chambers 13 and 14, a perforated cap 17 being provided for each boss. The caps 17 have perforated inner ends 18 through which the salt and pepper may be sifted from the compartments 13 and 14. A knurled flange 19 for each cap 17 depends below the bosses 15 for convenience in removing and replacing the caps.

A transverse rod 20 secured through each of the compartments 13 and 14 has a lever 21 pivoted thereon with a closure plate 22 pivoted to the lower end of the lever for closing over the caps 17 of the compartment when the lever 21 is positioned vertically. An operating rod 23 for each of the levers 21 is pivoted to the upper ends thereof slidably positioned through the perforation 24 in the adjacent end of a tubular or cup-shaped depression 25 in the adjacent end of the casing 10. A depression 25 being provided in each opposite end of the casing 10 projects inwardly of each compartment 13 and 14 and a cylindrical block 26 is slidably mounted in each of said depressions attached to the adjacent outer end of the lever operating rods 23. Springs 27 within the depressions 25 normally press the blocks 26 outwardly with the plates 22 closing the outlet caps 19. Upon pressing inwardly upon either block 26, the rod 23 attached thereto will be forced inwardly toward the partition 12, thereby rocking the adjacent lever 21 and elevating the plate 22 from the cap plate 18.

In this manner, the casing 10 may be grasped in the hand and both of the blocks 26 depressed by the fingers for simultaneously opening the grids or perforated plates 18 of both caps 17 and permitting the salt and pepper to be sifted out of the compartments 13 and 14 through the bottom of the casing 10. Either the salt or pepper may be sifted separately from its compartment by pressing the block 26 of the compartment. The transverse rod 20, is slightly resilient further in assisting closely seating the plate 22 upon its cap 17, the springs 27 being sufficiently strong to position the levers 21 vertically and bring said plates 22 flatly upon the caps 17.

Inwardly projecting bosses 28 in the top of the casing 10 have threaded plugs 29 for closing the same, the assembling of the device as well as access to the pivotal connections between the rods 20 and 23 and lever 21 being made easy by removing the plugs 29. The condiments are sifted through the bottom 16 within the flange 11 and when the device is seated upon the table such as 30 the outlets for the condiments are invisible and it is unnecessary to invert the casing 10 to extract the contents thereof as usually required with such holders.

While the form of the invention herein set forth is believed preferable, it will be understood that changes may be made therein without departing from the spirit and scope of my invention.

What I claim as new is:—

1. A condiment holder comprising a casing having a partition forming separate compartments therein, a depending supporting flange upon the bottom of the casing, bosses projecting from the bottom of the casing within said flange having opening communications with said compartments, perforated caps removably positioned within said bosses, cup-shaped members projecting from the opposite ends of the casing inwardly of said compartments, a closure plate within each compartment adapted for flatly seating upon the cap thereof, a cylindrical block slidable in each cup-shaped portion, operative connections between said blocks and plates and resilient means within said depressions adapted for normally projecting said blocks with the plates closed upon the caps.

2. In combination with a casing having a bottom opening, a depending supporting flange at the bottom of the casing, a perforated cap removable within said opening, a cup-shaped inwardly projecting portion at one end of the casing, a cylindrical block slidable in said cup-shaped portion, a closure plate for the cap, a resilient rod transversely within the casing, a lever pivoted upon said rod with said plate pivoted to the lower end of the lever adapted for overlying the cap when the lever is vertically positioned beneath the rod, operative connections between said lever and block, and means adapted to normally project the block with the plate in its closed position.

In testimony whereof I affix my signature.

JOHN NIERODKA.